(12) United States Patent
Glaser

(10) Patent No.: US 6,271,506 B1
(45) Date of Patent: Aug. 7, 2001

(54) WIDE VOLTAGE RANGE CONTROL FOR AN ELECTRIC RESISTANCE HEATER

(75) Inventor: John Stanley Glaser, Niskayuna, NY (US)

(73) Assignee: General Electric Company, Schenectady, NY (US)

(*) Notice: Subject to any disclaimer, the term of this patent is extended or adjusted under 35 U.S.C. 154(b) by 0 days.

(21) Appl. No.: 09/432,239

(22) Filed: Nov. 3, 1999

(51) Int. Cl.⁷ ...................................................... H05B 1/02
(52) U.S. Cl. .......................... 219/505; 219/497; 219/413; 323/235
(58) Field of Search .................... 219/497, 499, 219/501, 505, 506, 411–414; 307/117; 323/235, 236, 319

(56) References Cited

U.S. PATENT DOCUMENTS

| | | | |
|---|---|---|---|
| 3,553,428 | * | 1/1971 | McGhee ................................ 219/494 |
| 3,924,102 | * | 12/1975 | Hanekom ............................. 219/494 |
| 4,340,807 | * | 7/1982 | Raskin et al. ......................... 219/497 |
| 4,858,576 | * | 8/1989 | Jeffries et al. ....................... 123/145 A |
| 5,079,410 | * | 1/1992 | Payne et al. ............................ 219/506 |
| 5,293,028 | | 3/1994 | Payne . | 
| 5,340,964 | * | 8/1994 | Galloway et al. .................... 219/486 |

OTHER PUBLICATIONS

"Multi–Period cycle–Skipping for Low Flicker, Fine–Resolution Power Control," John S. Glaser et al., GE docket RD–27,326, filed concurrently herewith.

"Cycle–Skipping Power Control for AC Line–Powered Loads," John S. Glaser et al., Serial No. 09/366,304 (GE docket RD–26,550), filed Aug. 2, 1999.

\* cited by examiner

*Primary Examiner*—Mark Paschall
(74) *Attorney, Agent, or Firm*—Jill M. Breedlove; Douglas E. Stoner

(57) ABSTRACT

A heater controller uses measured power source voltage and either stored data that characterizes an electric resistance heater or current measurements to compute the fraction of time that the heater should be connected to the power source, thereby compensating the electric resistance heater against variations in the AC line voltage such that the heater power remains constant with line voltage variations, even for different nominal line voltages.

10 Claims, 1 Drawing Sheet

WIDE VOLTAGE RANGE CONTROL FOR AN ELECTRIC RESISTANCE HEATER

BACKGROUND OF THE INVENTION

The present invention relates generally to line voltage regulation and, more particularly, to line voltage regulation suitable for providing wide voltage range control for an electric resistance heater, for example, such as in electrical cooking apparatus.

The most common approach to temperature control for cooking apparatus is to use a closed-loop control wherein the temperature of the heating element is determined using a sensor, and an automatic control is used to adjust the power to the heating element in order to reach and maintain the desired temperature. A thermostat may be used for this purpose. Although closed-loop temperature control is effective, it is not easy or practicable for some applications.

In apparatus employing resistive heating elements powered by an external source of electric power, it is desirable to regulate the energy dissipated in the heating element against variations in voltage. For a heating element with a fixed resistance, the power dissipated in the element is proportional to the voltage-squared such that small changes in source voltage can result in large changes in element power. For some applications, such as cooking appliances, for example, such variations can result in performance degradation.

Accordingly, it is desirable to provide line voltage regulation (or compensation) such that an effectively constant power is provided to a heating element, for example, even though the line voltage is varying. It is furthermore desirable that such line voltage compensation for heating apparatus would enable operation over a wide voltage range or even in systems with different nominal voltages.

BRIEF SUMMARY OF THE INVENTION

An electric resistance heater for a cooktop is compensated against variations in the AC line voltage such that the heater power remains substantially constant with line voltage variations, and consistent operation is achieved even for different nominal line voltages. To this end, a heater control algorithm uses measured power source voltage and either stored data that characterizes the heater or current measurements to compute the fraction of time D that the heater should be connected to the power source. A power transfer element controls the value of D by cycle-skipping or pulse width modulation, for example.

DETAILED DESCRIPTION OF THE INVENTION

Figure 1:
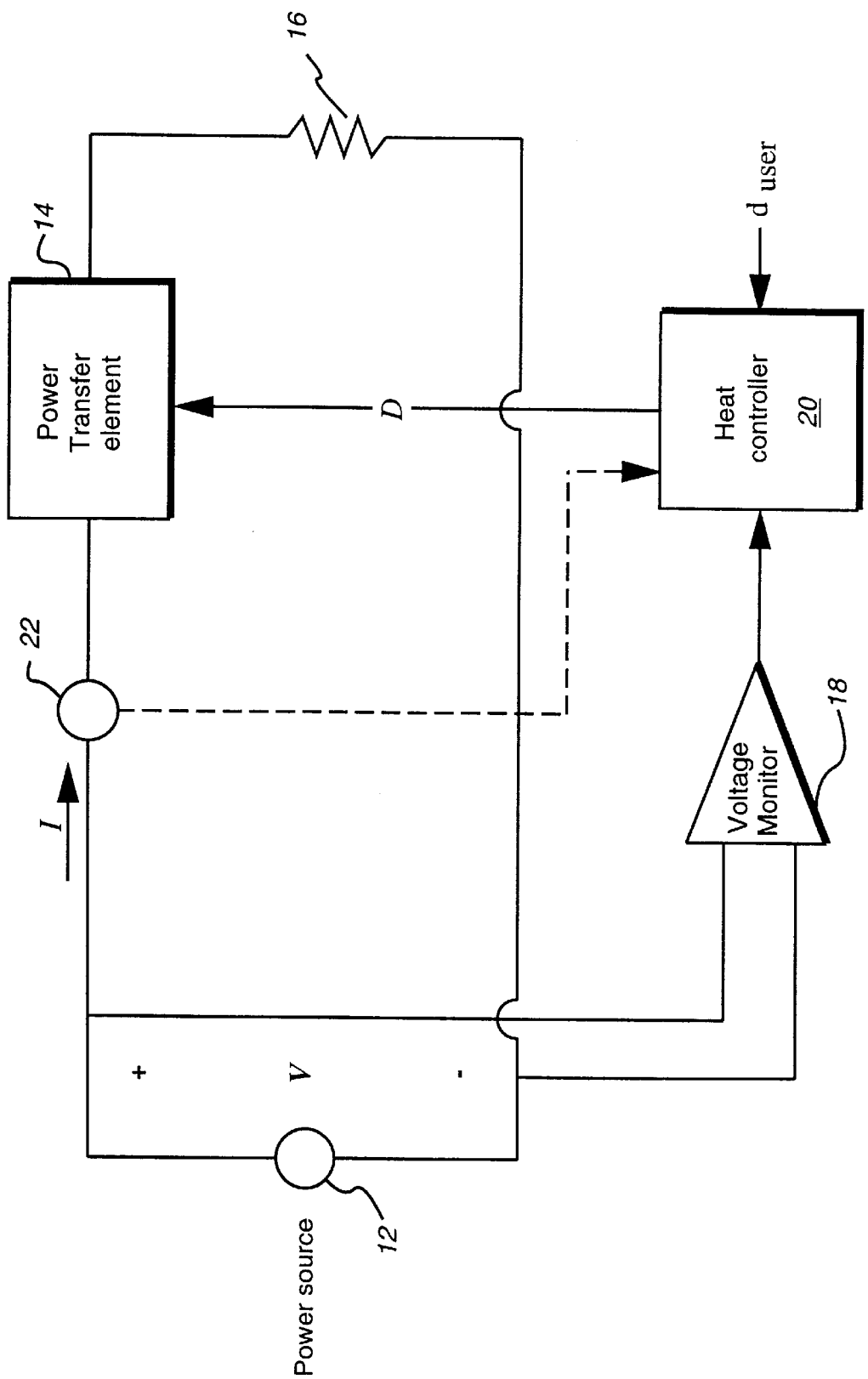
FIG. 1 is a block diagram illustrating alternative embodiments of a power control system in accordance with the present invention.

FIG. 1 illustrates an exemplary power control system 10 in accordance with the present invention. A power source 12 (e.g., AC utility power) supplies power via a power transfer element 14 to a heating element 16. An exemplary heating element 16 is a resistive element, the simplest case comprising a constant resistance. A voltage monitor 18 is provided for monitoring the power source voltage in any suitable manner. A controller 20 adjusts the output of the power transfer element 14 such that the power supplied to the heating element is held substantially constant. An input to heater controller 20 comprises a user-commanded input $d_{user}$, as described hereinbelow. In addition, in one embodiment, as illustrated by dashed lines in FIG. 1, another input to heater controller 20 comprises the current I drawn by the heating element, as sensed by a current sensor 22.

In exemplary embodiments of the present invention, power transfer element 14 controls the fraction of time that the power source is connected to the load, such as by known pulse-width modulation or cycle-skipping methods.

Controller 20 enables implementation of a heater control algorithm which uses measured power source voltage and either stored data that characterizes the heater or current measurements to compute the fraction of time the heater should be connected to the power source, represented herein as the heater duty cycle D. In order to implement the controller, a heater resistance is selected that will supply the desired maximum heat dissipation $P_{max}$ with the minimum expected source voltage $V_{min}$. As the voltage decreases above this minimum value $V_{min}$, the duty cycle D is decreased so that the appropriate average power is delivered to the heater.

Assuming a controller that compensates for variations in line voltage V and burner resistance R, burner power is ideally represented as:

$$P_{burner} = D \frac{V^2}{R}$$

where $D = d_{user} d_{heater} d_{voltage}$; $d_{user}$ represents a user-commanded fraction of rated power, $d_{heater}$ represents a burner compensation factor, and $d_{voltage}$ represents a line voltage compensation factor.

The user-commanded fraction of maximum rated power $d_{user}$ can be used to set power dissipation to any level below $P_{max}$.

The line voltage compensation factor is represented by the following:

$$d_{voltage} = \left(\frac{V_{min}}{V}\right)^2,$$

where $V_{min}$ represents the minimum specified line voltage for rated power.

The burner compensation factor $d_{heater}$ for a fixed resistance is equal to one. However, most resistive materials have a resistance that varies with the power dissipated in the material, resulting from a variation of the material's resistivity with temperature and age. If these variations in resistivity are not negligible, it may be necessary or desirable to compensate for them.

With regard to systems employing current sensor 22, the burner compensation factor $d_{heater}$ is represented by the following:

$$d_{heater} = \frac{R}{R_{max}} = \frac{V}{IR_{max}},$$

where $R_{max}$ represents the maximum specified burner resistance for rated power, and I represents heating element current as determined from the current sensor.

For systems without a current sensor, to determine the burner compensation factor $d_{heater}$ for a particular heater, its resistance is measured over the expected power range. The resulting data can be used to develop a function $d_{heater}(d_{user}, V)$, which function compensates for changes in resistance of the heater, thereby improving the accuracy of the power control.

If burner resistance is not compensated for, the equation for D is represented as follows:

$$D = d_{user}\frac{1}{V^2}V_{min}^2.$$

Advantageously, by compensating an electric resistance heater using the algorithm set forth hereinabove with or without current sensing, heater power will remain substantially constant with line voltage variations such that consistent operation is achieved even if the appliance is used in a variety of locations with different nominal line voltages.

While the preferred embodiments of the present invention have been shown and described herein, it will be obvious that such embodiments are provided by way of example only. Numerous variations, changes and substitutions will occur to those of skill in the art without departing from the invention herein. Accordingly, it is intended that the invention be limited only by the spirit and scope of the appended claims.

What is claimed is:

1. A system for controlling an electric resistance heater, comprising:
    a voltage monitor for monitoring an input voltage from an external source; and
    a heater controller for maintaining power supplied to the electric resistance heater substantially constant at a predetermined user-commanded level by adjusting the duty cycle thereof based on the input voltage, the input current, the resistance of the electric resistance heater, and the user-commanded power level.

2. The system of claim 1 wherein the user-commanded power level depends on a user-commanded fraction of rated power, a heater compensation factor, and a line voltage compensation factor.

3. The system of claim 1 wherein the resistance of the heater is determined from stored data, the stored data comprising resistance measurements over a predetermined power range.

4. A system for controlling an electric resistance heater, comprising:
    a voltage monitor for monitoring an input voltage from an external source;
    a current sensor for measuring input current drawn by the electric resistance heater; and
    a heater controller for maintaining power supplied to the electric resistance heater substantially constant at a predetermined user-commanded level by adjusting the duty cycle thereof based on the input voltage, the input current, the resistance of the electric resistance heater, and the user-commanded power level.

5. The system of claim 3 wherein the resistance of the heater is determined from stored data, the stored data comprising resistance measurements over a predetermined power range.

6. A method for controlling an electric resistance heater, comprising:
    monitoring an input voltage from an external source; and
    maintaining power supplied to the electric resistance heater substantially constant at a predetermined user-commanded level by adjusting the duty cycle thereof based on the input voltage, the input current, the resistance of the electric resistance heater, and the user-commanded power level.

7. The method of claim 6 wherein the user-commanded power level depends on a user-commanded fraction of rated power, a heater compensation factor, and a line voltage compensation factor.

8. The method of claim 6 wherein the resistance of the heater is determined from stored data, the stored data comprising resistance measurements over a predetermined power range.

9. A method for controlling an electric resistance heater, comprising:
    monitoring an input voltage from an external source;
    measuring input current drawn by the electric resistance heater; and
    maintaining power supplied to the electric resistance heater substantially constant at a predetermined user-commanded level by adjusting the duty cycle thereof based on the input voltage, the input current, the resistance of the electric resistance heater, and the user-commanded power level.

10. The method of claim 9 wherein the step of maintaining comprises determining the resistance of the heater from stored data, the stored data comprising resistance measurements over a predetermined power range.

* * * * *